(12) United States Patent
Ro

(10) Patent No.: US 9,054,537 B2
(45) Date of Patent: Jun. 9, 2015

(54) ELECTRIC TOOL WITH CONTROLLER OF BATTERY PACK AND THE CONTROL METHOD THEREOF

(75) Inventor: Hun-Tae Ro, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 382 days.

(21) Appl. No.: 13/591,044

(22) Filed: Aug. 21, 2012

(65) Prior Publication Data

US 2013/0200853 A1 Aug. 8, 2013

(30) Foreign Application Priority Data

Feb. 2, 2012 (KR) ........................ 10-2012-0010767

(51) Int. Cl.
*H02J 7/00* (2006.01)
(52) U.S. Cl.
CPC .................................... *H02J 7/0026* (2013.01)
(58) Field of Classification Search
CPC ................. H02J 2007/004; H02J 2007/0037; H02J 2007/0039; H02J 2007/0067; H02J 7/0091
USPC ......................................... 320/127, 128, 134
See application file for complete search history.

(56) References Cited

U.S. PATENT DOCUMENTS

| | | | | |
|---|---|---|---|---|
| 5,477,130 A * | 12/1995 | Hashimoto et al. | ............. | 429/92 |
| 5,705,911 A * | 1/1998 | Tamai | ........................ | 320/134 |
| 5,729,061 A * | 3/1998 | Narita | ........................ | 307/130 |
| 6,501,248 B2 * | 12/2002 | Fujiwara | ...................... | 320/136 |
| 6,812,673 B2 * | 11/2004 | Fujiwara | ...................... | 320/136 |
| 6,924,625 B2 * | 8/2005 | Teraoka et al. | ................ | 320/150 |
| 7,479,894 B2 * | 1/2009 | Song | ......................... | 340/636.1 |
| 7,495,416 B2 * | 2/2009 | Sato et al. | ..................... | 320/134 |
| 7,508,171 B2 * | 3/2009 | Carrier et al. | ................. | 320/138 |
| 7,579,811 B2 * | 8/2009 | Sato et al. | ..................... | 320/134 |
| 7,830,121 B2 * | 11/2010 | Sasaki | ........................ | 320/134 |
| 8,058,846 B2 * | 11/2011 | Kim | ............................ | 320/134 |
| 8,773,073 B2 * | 7/2014 | Kimura | ........................ | 320/134 |
| 2010/0073835 A1 | 3/2010 | Jung | | |
| 2011/0080140 A1 | 4/2011 | Hogari et al. | | |
| 2011/0205678 A1 | 8/2011 | Baba et al. | | |
| 2012/0062033 A1 | 3/2012 | Murofushi | | |

FOREIGN PATENT DOCUMENTS

| | | |
|---|---|---|
| JP | 2003-220576 | 8/2003 |
| JP | 2004-297957 | 10/2004 |
| KR | 10-2004-0041933 | 5/2004 |
| KR | 10-2010-0034312 | 4/2010 |

* cited by examiner

*Primary Examiner* — Sun Lin
(74) *Attorney, Agent, or Firm* — Robert E. Bushnell, Esq.

(57) ABSTRACT

An Electric tool with a controller for a battery pack and a control method thereof. The electric tool includes a battery pack, an operator and a controller The battery pack includes a plurality of battery cells and a protection circuit module detects and controls a state of charge and discharge of a plurality of battery cells. The operator receives power from the battery pack and converts the received power into physical energy. The controller controls the protection circuit module so as to perform a protection process of the battery pack in a state similar to over-discharge caused in the case in which the power is transferred from the battery pack to the operator and at the same time, the operator does not continuously operate.

14 Claims, 3 Drawing Sheets

ELECTRIC TOOL WITH CONTROLLER OF BATTERY PACK AND THE CONTROL METHOD THEREOF

CLAIM OF PRIORITY

This application makes reference to, incorporates the same herein, and claims all benefits accruing under 35 U.S.C. §119 from an application earlier filed in the Korean Intellectual Property Office on 2 Feb. 2012 and there duly assigned Serial No. 10-2012-0010767.

BACKGROUND OF THE INVENTION

1. Field of the Invention

The present invention generally relates to a battery operated electric tool.

2. Description of the Related Art

Generally, a portable electric device such as a lap top computer and a portable electric tool includes a battery pack capable of being charged in order to receive power required in a corresponding device. The battery pack includes a plurality of battery cells, a protect device preventing over-charge or over-discharge of each battery cell and a battery management unit (BMU), and the like.

The above information disclosed in this Related Art section is only for enhancement of understanding of the background of the invention and therefore it may contain information that does not form the prior art that is already known to a person of ordinary skill in the art.

SUMMARY OF THE INVENTION

The present invention provides a device for accurately determining an over-discharge state and a state similar to over-discharge according to an excessive output.

The present invention provides a device and method of appropriately sensing an over-discharge state and a state similar to over-discharge to allow a process for protecting a battery cell to be rapidly performed.

An electric tool according to the present invention may include a battery pack, an operator and a controller.

The battery pack may include a plurality of battery cells supplying power and a protection circuit module detecting to control a charge and discharge state of the plurality of battery cells.

The operator receives power from the battery pack and converts the received power into physical energy.

The controller controls the protection circuit module so as to perform a protection process of the battery pack in a state similar to over-discharge caused in the case in which the power is transferred from the battery pack to the operator and at the same time, the operator does not continuously operate.

In addition, the electric tool may further include an operation detector detecting a physical operation of the operator. Further, the electric tool may further include a current detector detecting a current amount transmitted to the operator.

Furthermore, the controller may receive a signal indicating that the operator does not operate from the current detector and determine that the battery cell is in the state similar to over-discharge in the case which the current detector detects a value of a preset current amount or more.

Furthermore, the electric tool may further include a voltage detector measuring output voltage of the battery pack. In this case, the controller determines whether the battery cell is in the state similar to over-discharge in the case in which a value measured from the voltage detector is smaller than a preset low voltage state reference value.

The controller may control the protection circuit module so as to perform the protection process of the battery pack after delay time elapses from a point in time in which the value measured from the voltage detector becomes the preset low voltage state reference value or less.

The delay time may be calculated as a value corresponding to a predetermined reference temperature.

In addition, the electric tool may further include a temperature detector measuring an external temperature of the battery pack. In this case, the controller changes the delay time according to a difference between the reference temperature and the measured temperature. Furthermore, the controller may change the delay time so as to be in inverse proportion to the measured temperature.

Meanwhile, a control method of an electric tool according to the present invention which may include the following steps, but all these steps may not be required and it should not be construed that the steps are restricted to the order in which they are presented.

In a first step, it is determined whether a battery cell enters a low voltage state during a process of the an electric tool.

In a second step, an elapsed time of the low voltage state starts to be counted.

In a third step, it is determined whether the battery is in a state similar to an over-discharge state.

In a forth step, a process protecting the battery with respect to the over-charge in the case which the low voltage state arrives at a preset delay time or the battery cell is in a state similar to over-discharge is performed.

In addition, the third step may periodically be performed.

In addition, in the case in which the electric tool is supplied with current of a preset current amount or more and at the same time does not physically operate in the third step, it is determined that the battery cell is in the state similar to the over-discharge.

In addition, the second and third steps may be initially performed simultaneously.

In addition in the fourth step, the delay time is updated so as to be an inverse proportional to an external temperature of the electric tool.

According to the present invention, the over-discharge state and the state similar to the over-discharge according to the excessive output may be accurately determined.

In addition, according to the present invention, the over-discharge state and the state similar to the over-discharge is appropriately sensed to allow the process for protecting the battery cell to be rapidly performed, thereby making it possible to prevent a deterioration phenomenon of the battery cell that may be generated when the state similar to the over-discharge continues.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
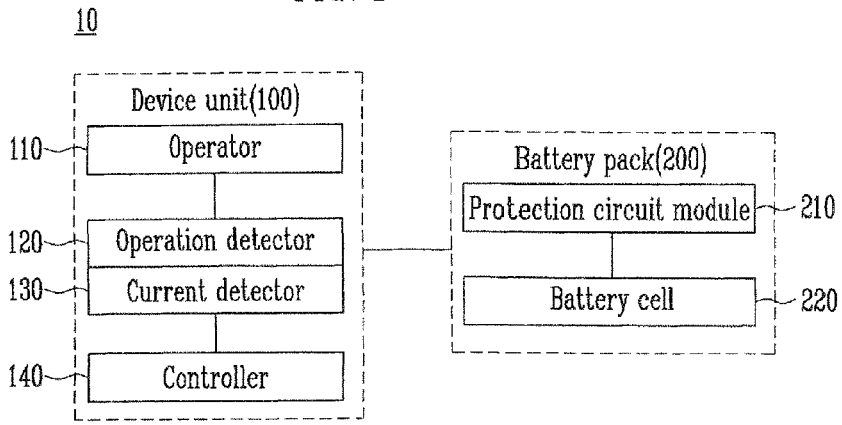
FIG. 1 is a block diagram showing an electric tool including a controller of a battery pack according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, exemplary embodiments of the present invention will be described with reference to the accompanying drawings. Unless specifically defined and stated, terms referring to a direction used in the present description are based on a state in which they are shown in the accompanying drawings. In addition, the same reference numerals will be used to describe the same members in each exemplary embodiment.

Batteries in general each have a plurality of battery cells. In each of the battery cells forming the battery pack, there is a capacity deviation due to various reasons in a manufacturing process. Therefore, a deviation is generated in charge and discharge voltages of each battery cell during a charge and discharge cycle of the battery pack. Accordingly, a particular cell may be over-charged during the charge the battery pack, and a particular cell may be over-discharged during discharge the battery pack. As described above, the over-charge and over-discharge of the particular battery cell in the battery pack reduces capacity of the battery pack, degrades the battery pack, and shorten a life span of the battery cell.

Meanwhile, in addition to this general over-charge and over-discharge, in case in which a load of work using an electric tool is out of an output range of the electric tool, for example, in case in which the electric tool is not working even through the maximum power or current is supplied to the electric tool, when this state continues, the electric tool becomes a state similar to over-discharge that voltage of the battery rapidly decreases even though the electric tool is not an over-discharge state, and the battery is deteriorated. A protect process has to prepare in order to protect the battery correspond to the state similar to over-discharging according to product characteristic and also general over-discharging and over-charging.

Figure 2:
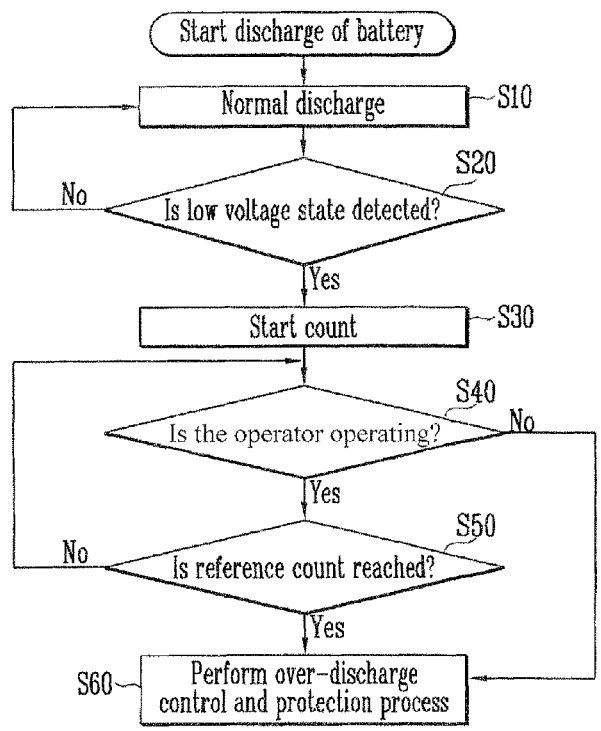
FIG. 2 is a flow chart showing a control process of a battery pack of the electric tool according to the exemplary embodiment of the present invention.
Figure 3:
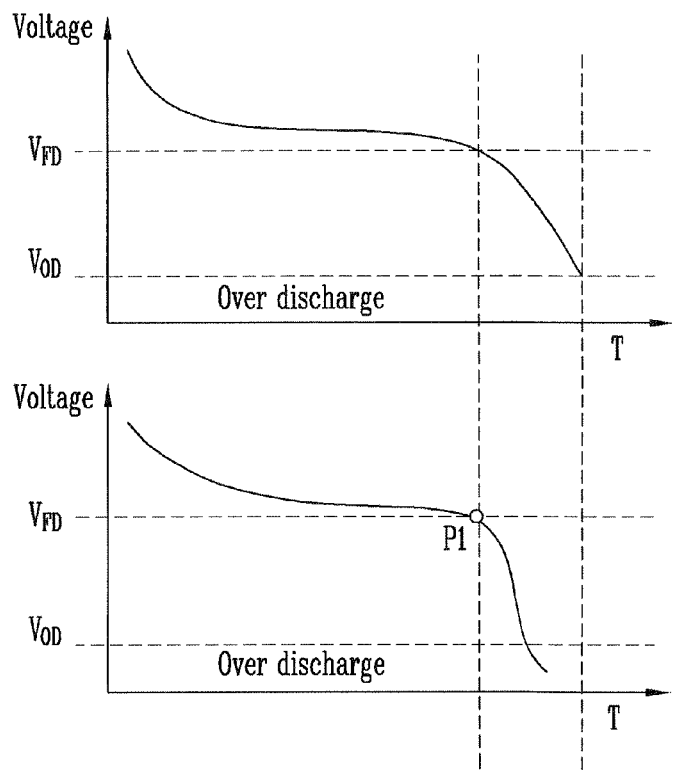
FIG. 3 is a graph comparing a normal discharge state and a state similar to over-discharge with each other.

FIG. 1 is a block diagram showing an electric tool including a controller of a battery pack according to an exemplary embodiment of the present invention; FIG. 2 is a flow chart showing a control process of a battery pack of the electric tool according to the exemplary embodiment of the present invention; and FIG. 3 is a graph comparing a normal discharge state and a state similar to over-discharge with each other.

Referring to FIG. 1, an electric tool 10 according to an exemplary embodiment of the present invention will be described. FIG. 1 is a block diagram showing an electric tool including a controller of a battery pack according to an exemplary embodiment of the present invention.

The battery pack 200 may include a plurality of battery cells 220 and a protection circuit module 210. The battery cell 220 supplies required power to a device unit 100 to be described below. The protect circuit module 210 or a battery management unit (BMU) monitors an operation state of the battery cell 220 and performs a control required for health of the battery cell 220. In addition, the protection circuit module 210 detects and controls a charge and discharge state of the battery cell 220.

The device unit 100 refers a configuration of the electric tool that excludes the battery pack 200. The battery pack 200 is provided at an inner portion or an outer portion of the device unit 100 and electrically connected to the device unit 100. A mechanical connection scheme between the battery pack 200 and the device unit 100 is not limited described in this application.

The operator 110 receives power from the battery pack 220 to convert the received power into physical/kinetic/mechanical energy. For example, in the case of the electric tool such as a drill, a tip of the electric tool serves to drill a hole in a wall or to insert a screw into the wall. Here, the tip of the electric tool, a shaft connected to the tip, and a motor rotating the shaft may correspond to the operator 110. That is, a component converting electrical energy into a mechanical, physical or kinetic energy regardless of a name or mechanical structure and using the converted energy corresponds to the operator 110.

The operation detecting unit 120 is a component sensing whether or not the operator 100 operates. The operation detecting unit 120 may use an electrical or a mechanical sensor in order to sense an operation of the operator 110. A configuration of the operation detecting unit 120 is not limited to that illustrated here. For example, an electric drill may include a magnetic sensor, a photo sensor, or the like, detecting rotation of the shaft. Rotation of the shaft may be sensed by the magnetic sensor or the photo sensor.

The current detector 130 may detect current transferred to the operator 110. The electric drill may detect current supplied to a motor rotating the shaft.

The controller 140 may receive a state of the battery cell 220 from the protect circuit module 210.

Meanwhile, in the case of driving a screw using an electric drill, when a screw having a predetermined depth is driven, such that it is difficult to further rotate the electric drill, the electric drill enters a high output state; however, a tip portion of the electric drill does not rotate or rotates at a relatively decreased speed. In this case, an effect similar to full-discharge is generated in view of the secondary battery, and when a state similar to over-discharge (similar to the full-discharge) is repeated, deterioration of the cell is deepened.

Generally, the battery cell is discharged as shown in an upper graph of FIG. 3. That is, the battery cell according to the general use is continuously discharged and then arrives at a full-discharge state $V_{FD}$ on specification. Then, in the case in which the battery cell is continuously discharged, the battery cell arrives at an over-discharge state after a predetermined time elapses. When the over-discharge state continues, the battery cell 220 may lose reversibility of charge and discharge.

Meanwhile, in a case the state similar to the over-discharge, voltage temporarily decreases rapidly as shown in a lower graph of FIG. 3. In this case, a time required to arrive at the over-discharge state is further shortened. That is, in the case of a method of performing an over-discharge preventing process after a predetermined time from a point in time in which voltage is lowered to a predetermined voltage or less, it is difficult to prevent deterioration of the battery cell due to this state similar to the over-discharge.

The controller 140 may be connected to the operation detector 120 and the current detector 130. The controller 140 receives a signal indicating whether the operate unit 110 is in an operating state or is in a non-operating state from the operation detector 120. In addition, the controller 140 receives whether or not current is being supplied from the current detector 130 to the operator 110. The controller 140 periodically receives a correspond signals from the current detector 130 and the operation detector 120 from a point in time in which it may be determined that the battery cell 230 is in a low voltage state.

The controller 140 periodically receives the signals and then monitors whether the operator 110 is in the non-operating state and at the same time, is supplied with the current. When both of a condition in which the operator 110 is in the non-operating state and a condition in which the operator 110 is continuously supplied with the current are satisfied, the controller 140 determines that the battery cell is in the state similar to the over-discharge.

The controller 140 count from a time from a point in time in which it is doubted that voltage of the battery cell 220 is an excessive output from the protection circuit module 210, that is, a point in time in which it is determined that the battery cell 220 is in a low voltage state and performs the over-discharge preventing process after a predetermined point in time elapses. In addition, also in the case in which the operator 110 does not operate and at the same time, is supplied with the current or supplied with current having a preset current amount or more, the over-discharge preventing process is performed. The controller 140 performs these two processes to control the protection circuit module 210 so as to perform the over-discharge protection process.

Referring to FIGS. 2 and 3, a control method of an electric tool according to the present embodiment will be described.

After an electric tool operates, the electric tool starts to be normally discharged (S10). Then, a voltage state of a battery cell may be received from a protection circuit module during an operation of the electric tool to determine whether or not the battery cell becomes a low voltage state (S20).

In the case in which it is detected that the battery cell is the low voltage state, a time elapsing from a start time of the low voltage state may be counted (S30). Next, whether or not an operator operates is periodically determined (S40) until a reference count is reached, that is, from the start time of the low voltage state to a point in time in which a predetermined time elapses (S50). As described above, in the case in which the operator does not operate even though it may be continuously supplied with current, an over-discharge control and protection process is performed, and in the case in which the operator continuously operate, when the reference count is reached, an over-discharge control and protection process may be performed.

Meanwhile, a start of the count and a step of detecting whether or not the operator operates may also be simultaneously performed.

Figure 4:
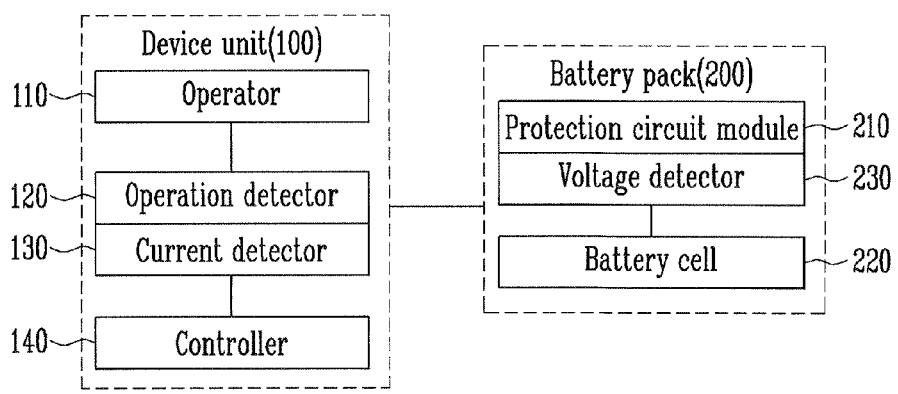
FIG. 4 is a block diagram showing an electric tool including a controller of a battery pack according to another exemplary embodiment of the present invention.

Referring to an electric tool according to another exemplary embodiment of the present invention will be described. FIG. 4 is a block diagram showing an electric tool including a controller of a battery pack according to another exemplary embodiment of the present invention.

The battery pack 200 may further include a voltage detector 230 measuring output voltage thereof. In this case, the controller 140 starts to determine whether or not the battery cell may be in the state similar to the over-discharge in the case in which a value measured from the voltage detector 230 is smaller than a preset low voltage state reference value. That is, the controller 140 starts a count in order to check the elapse of a predetermined time and periodically determines whether or not the battery cell is in the state similar to the over-discharge in the case in which the value measured from the voltage detector 230 is smaller than the low voltage state reference value. A case in which the battery pack may be in the state similar to the over-discharge means the case in which the operator 110 does not operate and at the same time, may be supplied with the current, as described above.

A configuration other than the above-mentioned configuration is the same as that of prior exemplary embodiments.

Figure 5:
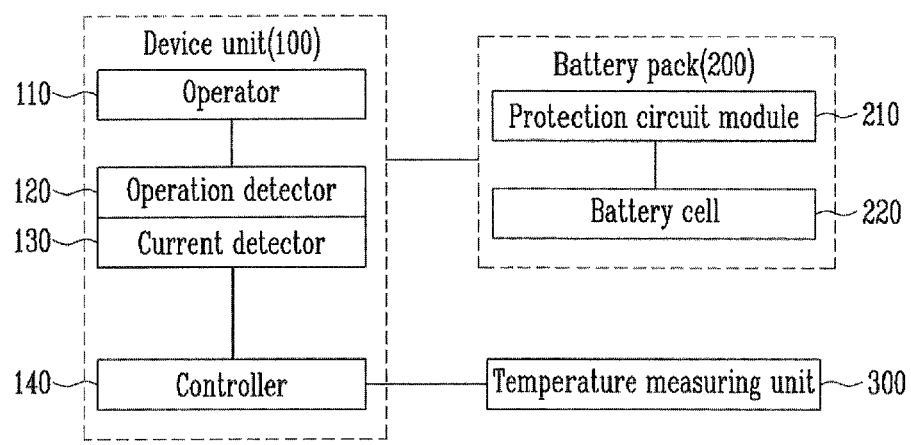
FIG. 5 is a block diagram showing an electric tool including a controller of a battery pack according to still another exemplary embodiment of the present invention.
Figure 6:
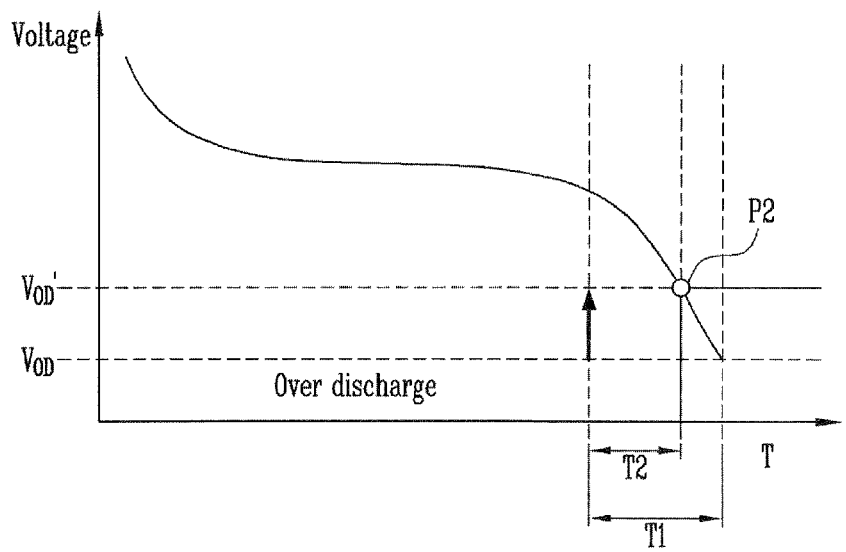
FIG. 6 is a graph explaining to cut-off of over-discharge according to a temperature.

Referring to FIGS. 5 and 6, an electric tool according to still another embodiment of the present invention will be described. FIG. 5 is a block diagram showing an electric tool including a controller of a battery pack according to still another exemplary embodiment of the present invention; and FIG. 6 is a graph explaining cut-off of over-discharge according to a temperature.

The electric tool according to the present embodiment may further include a temperature measuring unit 300 measuring an external temperature of the electric tool, that is, a device unit 100 and a battery pack 200.

As the external temperature rises, cut-off voltage $V_{OD}$ evaluating that the battery cell 200 may be over-discharged rises as shown in FIG. 6. The battery cell arrives at an over-discharge state or a state similar to over-discharge more rapidly in the case in which an over-discharge phenomenon or a phenomenon similar to over-discharge may be generated than in the case in which an external temperature is low. Therefore, the controller 140 may control a time counted until the over-discharge control and protection process may be performed after the low voltage state is detected, that is, a delay time, so as to correspond to a temperature measured by the temperature measuring unit 300. Here, the delay time may be calculated as a value that is in inverse proportion to a temperature.

As described above, in the case in which the over-discharge is generated, a secondary battery is discharged in excess of its capacity. When this phenomenon is continued, the reversibility of the charge and discharge is lost due to a chemical reaction. The over-discharge control and protection process for preventing this over-discharge phenomenon or phenomenon similar to over-discharge is performed by the protection circuit module 210 or the battery management unit (BMU).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electric tool, comprising:
  a battery pack having a battery cell for supplying power, and a protection circuit module for detecting and controlling a charge state and discharge state of the battery cell; and
  a device unit, comprising:
    an operator receiving a power from the battery pack to convert the received power into a physical/kinetic energy; and
    a controller controlling the protection circuit module so as to perform a protection process of the battery pack in a state similar to an over-discharge condition, which is a condition in which the power is transferred from the battery pack to the operator simultaneously, wherein the operator does not continuously operate.

2. The electric tool according to claim 1, wherein the device unit further comprises:
an operation detector detecting a physical operation of the operator; and
a current detector detecting a current amount transmitted to the operator.

3. The electric tool according to claim 2, wherein the controller receives a signal indicating that the operator does not operate from the current detector and determines that the battery cell is in the state similar to the over-discharge when the current detector detects a value of a preset current amount or more.

4. The electric tool according to claim 1, further comprising
a voltage detector measuring output voltage of the battery pack,
wherein the controller determines whether the battery cell is in the state similar to the over-discharge in a case in which a value measured from the voltage detector is smaller than a preset low voltage state reference value.

5. The electric tool according to claim 4,
wherein the controller controls the protection circuit module so as to perform the protection process of the battery pack after a preset delay time elapses from a point in time in which the value measured from the voltage detector becomes the preset low voltage state reference value or less.

6. The electric tool according to claim 5,
wherein the preset delay time is calculated as a value corresponding to a predetermined reference temperature.

7. The electric tool according to claim 6, further comprising
a temperature detector measuring an external temperature of the battery pack,
wherein the controller changes the preset delay time according to a difference between the predetermined reference temperature and the measured external temperature.

8. The electric tool according to claim 7,
wherein the controller changes the preset delay time so as to be in inverse proportion to the measured external temperature.

9. A computer-implemented control method of an electric tool, comprising:
(a) determining whether a battery cell becomes a low voltage state during an operation of the electric tool;
(b) starting counting an elapsed time of the low voltage state;
(c) determining whether the battery cell is in a state similar to an over-discharge; and
(d) performing a process protecting to protect the battery cell with respect to the over-discharge in a case in which the low voltage state arrives at a preset delay time or the battery cell is in the state similar to the over-discharge.

10. The method according to claim 9,
wherein the step of (C) is performed periodically.

11. The method according to claim 10,
wherein in a case in which the electric tool is supplied with a current of a preset current amount or more and, at the same time, the electric tool does not physically operate in the step (C), and it is determined that the battery cell is in the state similar to over-discharge.

12. The method according to claim 10,
wherein the step of (b) and the step (C) are simultaneously perform initially.

13. The method according to claim 9,
wherein in the step (d), the preset delay time is updated so as to be in inverse proportion to an external temperature of the electric tool.

14. An electrically powered device which receives its power from a battery pack, said battery pack having a battery cell for supplying power, a protection circuit module for detecting and controlling a charge state and discharge state of the battery cell, said electrically powered device comprising:
an operator receiving a power from the battery pack to convert the received power into a kinetic energy; and
a controller controlling the protection circuit module so as to perform a protection process of the battery pack in a state similar to an over-discharge condition, which is a condition in which the power is transferred from the battery pack to the operator simultaneously,
wherein the operator does not continuously operate.

* * * * *